United States Patent [19]

Nagel et al.

[11] 4,233,556
[45] Nov. 11, 1980

[54] VOLTAGE REGULATOR, PARTICULARLY FOR AUTOMOTIVE USE

[75] Inventors: Karl Nagel, Gemaringen, Fed. Rep. of Germany; Gerhard Conzelmann, Leinfelden-Echterdingen, Fed. Rep. of Germany

[73] Assignee: Robert Bosch GmbH, Stuttgart, Fed. Rep. of Germany

[21] Appl. No.: 936,026

[22] Filed: Aug. 23, 1978

[30] Foreign Application Priority Data

Aug. 29, 1977 [DE] Fed. Rep. of Germany ....... 2738897

[51] Int. Cl.³ .............................................. H02P 9/30
[52] U.S. Cl. ........................................ 322/28; 322/73
[58] Field of Search ...................... 322/28, 73; 320/39, 320/22, DIG. 1, 64

[56] References Cited

U.S. PATENT DOCUMENTS

| | | |
|---|---|---|
| 3,571,657 | 3/1971 | Domann . |
| 3,602,794 | 8/1971 | Westhaver .......................... 320/22 X |
| 3,984,755 | 10/1976 | Lenhoff et al. .......................... 322/28 |

*Primary Examiner*—Robert J. Hickey
*Attorney, Agent, or Firm*—Frishauf, Holtz, Goodman & Woodward

[57] ABSTRACT

To improve the regulating response of an automotive-type, solid-state voltage regulator and render it essentially immune to ripple while additionally permitting complete integration of the entire voltage regulator without external discrete filter capacitors, a difference amplifier has the output voltage of the on-board vehicle network, for example from an alternator, applied thereto for comparison with a reference, the difference amplifier, respectively, controlling a capacitor charge current supply and a discharge current drain circuit, both connected to a small capacitor in the order of, for example, only 30 pF which, hence, can be integrated, the voltage across the capacitor being sensed in a high-low window or range-type discriminator which has a dual-state output to control conduction or non-conduction of a transistor in series with the field of the alternator in dependence upon whether the voltage across the capacitor, as it is being charged or drained, is above an upper threshold or below a lower threshold of the discriminator. Preferably, the circuit includes current mirror circuits in which currents in one branch are reflected in another to provide for balance, temperature compensation, and to render the circuit immune to variations in loading on the alternator.

20 Claims, 4 Drawing Figures

VOLTAGE REGULATOR, PARTICULARLY FOR AUTOMOTIVE USE

The present invention relates to a voltage regulator, and more particularly to a voltage regulator for association with an automotive-type alternator to maintain the on-board voltage of a vehicle network at a predetermined constant level.

BACKGROUND AND PRIOR ART

Voltage regulators of various types for automotive vehicles are well known. In automotive on-board vehicular networks, it is customary to provide an alternating current generator, usually a three-phase generator, which feeds a bridge-type rectifier. A capacitor may be used to filter out ripple in the output voltage. The output voltage is sensed and compared with a reference. In dependence on the comparison, an error signal is obtained which controls the switching state of a switching element, typically a transistor, which connects or disconnects current flow through the field winding of the generator as the voltage varies with respect to the reference. Such a voltage regulator is described, for example, in U.S. Pat. No. 3,571,657, Domann, assigned to the assignee of this application, which, at its input, has an R/C filter network to provide relatively smooth output voltage, that is, to remove ripple from the rectified output of the alternator. The on-board vehicular network, although essentially characterized as a direct-current network, is subject to ripple and voltage peak disturbances, particularly when supplied from an a-c generator. Commutating peaks upon switching-over of the diodes will arise besides the inherent waviness or ripple of the rectified output voltage. Other disturbance voltages and stray peaks may occur caused, for example, directly by the switching of field current to the alternator by the voltage regulator itself. As described in the literature, the voltage peaks are smoothed by the internal resistance of the filter network, that is, of a divider network contained therein, and of the capacitor, which, together, form the R/C network. The amplitudes of the disturbance peaks and needle pulses must be damped in order to prevent effects thereof on the controller. These amplitudes must be substantially below the hysteresis range of the voltage regulator, that is, should be substantially below about 100 mV to 300 mV, considering an overall output voltage of about 12 V nominal. To increase the regulating frequency, and thus improve the dynamic characteristics of the network system, it has been proposed to let commutating peaks pass and not completely filter them out. A compromise must be made between static and dynamic conditions, in which the static conditions determine the control variation with respect to speed and loading. If the ripple on the capacitor increases beyond some predetermined values, a d-c voltage will occur on the base-emitter path of the input transistor to the voltage regulator which affects the sensing operation of the regulator by tending to apply to the regulator a voltage which is lower than that which actually occurs. This results in an undesirably low output voltage from the alternator, arising due to pecularities within the filtering circuit itself.

The circuit described requires capacity values of between 10 nF and 330 nF for the filter capacitor. Capacitors of this type cannot be monolithically integrated in an integrated network which forms the entire voltage regulator; discrete components are required, which increases the overall cost of the regulator since a separate assembly and soldering step is necessary.

THE INVENTION

It is an object to provide a voltage regulator which has a small filter capacitor, so small that it can be monolithically integrated in the circuit, which is suitable to control alternators regardless of loading, and efficiently, without substantial ripple output, and which can be so arranged that a reference voltage source can be used having a temperature coefficient independent of the voltage regulating level which is desired.

Briefly, a reference voltage source providing a reference value is connected to a differential amplifier to which a control voltage representative of the voltage of the dynamo electric machine is also connected. A charge current source supplies charge current to a capacitor which may be small, for example in the order of 30 pF; the capacitor is additionally connected to a discharge current control source draining current from the capacitor. The capacitor charge current supply and discharge current draining control are connected to and controlled by the differential amplifier in accordance with the relative value of the control voltage and the reference voltage. A high-low discriminator is connected to the voltage across the capacitor and controls current flow, or interruption of current, to the field of the controlled generator, typically an automotive alternator, in accordance with the respective voltage levels across the capacitor with respect to the "high" and "low" response levels of the discriminator. The capacitor simultaneously filters or provides a smooth output of the control operation of the regulator, while establishing voltage levels for response of the discriminator.

The smoothing or filtering capacitor can be held very small and thus permits monolithic integration with the remainder of the network components. The crystallographic surface on an integrated circuit chip required for a capacitor in the order of 30 pF is roughly only as great as the surface necessary to form the actual connection of a discrete capacitor. Even if the on-board network voltage is subject to substantial and possibly unsymmetrical ripple, no d-c net voltage will build up on the capacitor, so that the regulator will also efficiently control the operation of alternators operating with high output currents. The inherent frequency of operation of the control loop formed by the regulator-alternator system can be readily controlled, and a reference voltage source can be used having a temperature coefficient which is independent of the voltage level, the value of which is to be controlled.

In accordance with a feature of the invention, and which forms a preferred embodiment, the capacitor can be connected as a Miller integrator.

Drawings, illustrating preferred examples, wherein.

Figure 1:
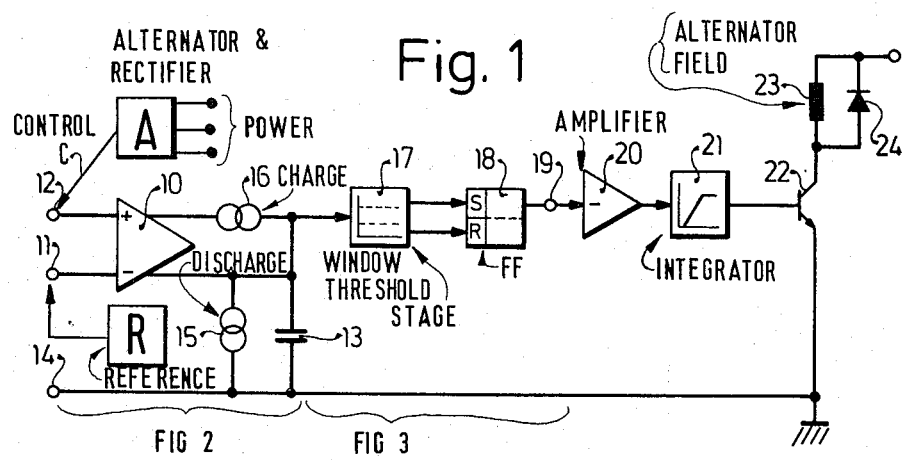
FIG. 1 is a general block diagram of the voltage regulator system.

An operational amplifier connected as a differential amplifier 10 (FIG. 1) has one input terminal 11 connected to the inverting input thereof, and another input terminal 12 connected to the direct input thereof. The inputs 11, 12 are, respectively, connected to a reference source R and to a control cable C from an alternator A forming, for example, the electrical power source for an automotive vehicle. The power output terminals, for connection to a rectifier and for subsequent connection to the on-board d-c vehicular network are shown only schematically. The control cable C can be connected to a separate control rectifier, to a field rectifier of the alternator, or to the d-c main supply bus of the vehicular network.

The output of the difference amplifier 10 associated with the inverting input is connected to one electrode of a capacitor 13, the other electrode of which is connected to a ground or reference terminal or bus 14. A capacitor discharge or drain control circuit 15 is connected in parallel to capacitor 13. A complementary output of the difference amplifier 10, and associated with the direct input of the differential amplifier 10, is connected through a charge control circuit 16 to the ungrounded electrode of the capacitor 13. Thus, capacitor 13 can be charged by the charge circuit 16 and can discharge through the discharge circuit 15 under controlled conditions. The active terminal or electrode of capacitor 13 is additionally connected to the input of a threshold stage 17. Threshold stage 17 is formed as a window threshold stage, that is, has a certain range between which it switches. Threshold stage 17 responds, or changes state, when the input passes either an upper or a lower threshold level with a dead zone therebetween. The outputs of the window discriminator or window threshold stage 17, and indicating whether the upper or lower threshold level thereof has been passed, are connected, respectively, to the set and reset inputs of a flip-flop (FF) 18, the output of which is connected over a terminal 19 to the input of an amplifier 20. Amplifier 20 is connected to an integrator 21 and controls the integration thereof. The integrator 21 has its output connected to a semiconductor switch, as shown to a transistor, the emitter of which is connected to the reference bus 14, and the collector through the field winding 23 of the alternator A. A free-wheeling or anti-kickback diode 24 is connected in parallel to the field 23. The reference voltage R is applied between the terminals 11 and 14; the alternator output voltage, as rectified, is connected over control bus C between terminals 12 and 14, the ground or reference or chassis connection of the alternator not being shown. The system is equally applicable to a d-c generator, in which the control cable C is directly connected to the d-c output of a d-c generator. Connection of the alternator field 23 with respect to the dynamo electric generator A to provide the desired output voltage, for example to supply a vehicular network and a battery, is well known and described, for example, in the Domann U.S. Pat. No. 3,571,657 referred to.

Operation, with reference to FIG. 1: The difference amplifier 10 provides two outputs which are, respectively, representative of the voltages, with respect to bus 14, of the direct and inverting inputs 12, 11. Thus, the direct input 12 controls the charge circuit 16, through the differential amplifier 10; the inverting input 11 controls the discharge circuit 15 through the differential amplifier 10. Upon equality of voltages at terminals 11 and 12, the currents in sources 15, 16 are equal. Within a linear control range, the summation current changes continuously between the maximum possible discharge current, that is, if the reference voltage is higher than the alternator voltage at terminal 12—and the maximum possible charge current, that is, the output voltage of alternator A, as sensed at terminal 12 is higher than the reference voltage at terminal 11. The current characteristics of the networks 15, 16 remain even beyond the linear control range. The difference current provides for charge on the capacitor 13, or discharge thereof. The window threshold stage or discriminator 17, connected to the capacitor, then controls the FF 18 in such a manner that, when the circuit 17 senses that the upper threshold level is being passed, the bistable FF 18 is placed in a first stable state; if, then, the threshold stage senses input which passes the lower threshold, the FF 18 switches back to a second stable state. The output signal of the FF 18 is amplified in amplifier 20, time-integrated in integrator 21, and used to control power transistor 22.

Let it be assumed that the alternator voltage at terminal 12 rises, that is, becomes higher than the reference voltage. The voltage at capacitor 13 will rise, since the capacitor will be charged by source 16 until the upper threshold level of window threshold stage 17 is reached. FF 18 switches over and transistor 22 will block. This causes disconnection of the field 23 from a power source, only generally indicated, and which may be the battery voltage, or a separately rectified output from alternator A. Since no further power will be supplied to the field, the alternator voltage will drop. When the voltage has dropped below the level of the reference R, the discharge circuit 15 will become effective, and capacitor 13 will discharge therethrough. This discharge will continue until the lower level of the window threshold stage 17 is reached, causing FF 18 to switch to its other stable state. Transistor 22 will again become conductive, which causes current flow through the field and hence an increase in voltage of the dynamo electric generator A.

As the transistor 22 switches into a conductive state, the charge carriers stored in the parallel-connected diode 24 must be cleared before a blocking voltage can build up in diode 24. Customary and usually used diodes have so much inertia that the output generator voltage would decrease substantially. This result is prevented by the integrator 21 which causes the transistor 22 to become conductive gradually, rather than switching over suddenly. Gradually increasing conductivity of the transistor permits slow build-up of the field, and hence suitable blocking of diodes 24.

The output voltage of the alternator is connected to the difference amplifier 10 without any intervening filter network, that is, directly through cable C to terminal 12. The current supply and draining circuits 16, 15, together with capacitor 13, effectively form an integrator, as will be explained in connection with FIG. 2.

The circuit of FIG. 1 does not, inherently, have hysteresis, and thus the window threshold stage 17 must have separate response levels. In theory, a voltage difference which goes towards zero at the input of the differential amplifier 10 is sufficient in order to effect switch-over of capacitor 13. Although the static response characteristic can be excellent, the inherent or natural frequency of oscillation can become very small, particularly in large systems of substantial inertia, which may lead to oscillations of charge indicator instruments, for example. The natural frequency of oscillation of the system can be increased readily by introduction of negative hysteresis. Both positive as well as negative hysteresis effects may occur, however, due to voltage drops across supply lines which have resistance which cannot always be neglected. Such non-negligible resistances are unavoidable in actual systems. Compensation for undesired hysteresis effects, or specific generation of desired hysteresis effects can readily be obtained by suitable circuits, however, which will be described in more detail below, and with reference to FIG. 4.

Figure 2:
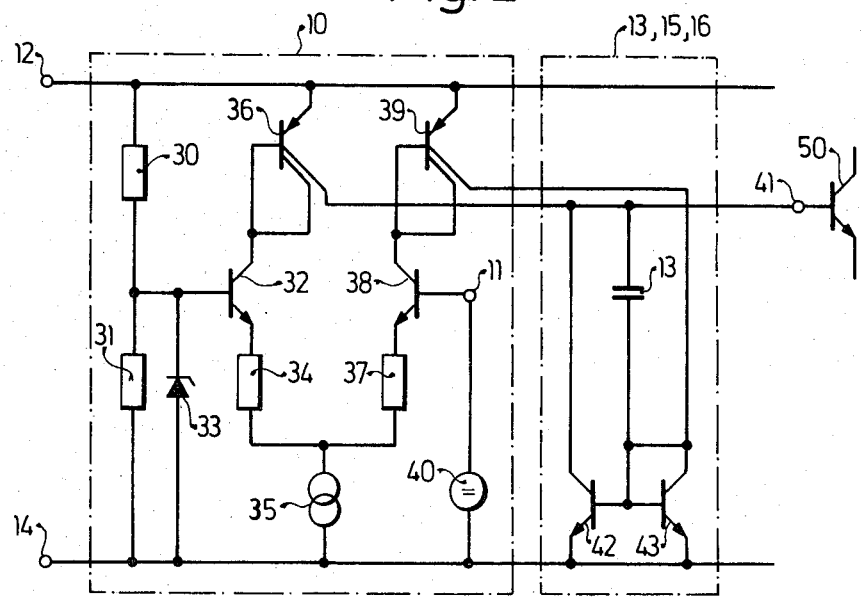
FIG. 2 is a detailed circuit diagram of the non-standard components of the voltage regulator system and showing, specifically, the detailed construction of the differential amplifier with subsequent charge-discharge networks for the capacitor.

The differential amplifier 10 and the charge-discharge circuits 16, 15 and capacitor 13, together forming an integrating network, are shown in detail in FIG. 2. A voltage divider formed of resistors 13, 31 is connected between terminals 12, 14; the tap is connected to the base of an npn transistor 32. A Zener diode 33 is connected in parallel to resistor 31. The emitter of transistor 32 is connected over resistor 34 to a current source 35, the other terminal of which is connected to ground or chassis or reference bus 14. The collector of transistor 32 is connected to the base of a transistor 36, as well as to a collector of a dual collector 36, the emitter of which is connected to terminal 12. An arrangement, identical to the elements 32, 34, 36, is connected to source 35, formed by a transistor 36, resistor 37 and dual collector transistor 39. Terminal 11 is connected to the base of transistor 38, and to a reference voltage source 40. The second collector of transistor 36 is connected to terminal 41 and over the collector-emitter path of npn transistor 42 to reference bus 14. The second collector of transistor 39 is connected through the collector-emitter path of npn transistor 43 to reference bus 14. The base of transistor 42 is connected to the base of transistor 43 and to one electrode of capacitor 13, the other electrode of which is connected to the second collector of transistor 36 and hence to terminal 41. The bases of transistors 42, 43 are additionally connected to the collector of transistor 43. Terminal 41 is connected to the base of an npn transistor 50 which forms the input transistor of discriminator or window threshold stage 17.

Operation, FIG. 2: The generator voltage applied between terminals 12 and 14 is reduced by means of voltage divider 30, 31 to approximately the value of the reference voltage of the reference source 40. Zener diode 33 protects the input circuit against overloading. The transistors 32, 36 on the one hand, and transistors 38, 39 on the other, are connected as current comparators, simulating a mirror-image current relationship. In transistors of opposite conductivity type, this means that interconnected collectors are additionally connected to the base of one of the transistors 36, 39, respectively. This circuit has the result that the collector current of transistor 32 is mirrored, or effectively reproduced in the second collector of the transistor 36, and the collector current of transistor 38 is mirrored or reproduced in the second collector of transistor 39; in other words, the collector currents of transistors 32, 36 or of transistors 38, 39, respectively, are equal. By use of multiple collectors, it is possible to divide the collector currents into smaller values, corresponding to the geometry of the collector division. The collector output current of the transistor 36 provides the charge current for capacitor 13. The collector output current of transistor 39 is again mirrored in the npn current mirror circuit 42, 43 in order to obtain a proper value for the discharge current. Since the bases as well as the emitters of transistors 42, 43 are interconnected, both transistors have practically the same voltage relationships or current relationships arising therein. Thus, the collector current of transistor 39 can control transistor 42 over transistor 43 to become conductive, thereby discharging capacitor 13. Transistor 50, preferably, is a transistor having extremely high current amplification, for example a Darlington pair, or a high-beta transistor, and is used to provide coupling for the charge voltage appearing across capacitor 13. Resistors 34, 37 preferably have the same resistance value and increase the linear control range of the difference amplifier 10.

Capacitor 13, as shown in FIG. 2, is not connected to ground or chassis but, rather, is connected in the form of a Miller integrator, that is, forms the Miller integrator capacitor, being connected between the collector and the base of transistor 42. Its effective capacity is thus increased by the factor of the current amplification of transistor 42. The capacity of capacitor 13 can thus be reduced by this factor in order to permit monolithic integration without, in the final result, decreasing its effect within the circuit. The voltage divider 30, 31 can be a high-resistance voltage divider, made possible by the use of the difference amplifier. Its action, as well as the higher voltage range available on the capacitor, made possible by the difference amplifier, permit a decrease of the actual capacity of the capacitor 13 with respect to a filter capacitor as customarily used in the prior art.

A suitable value for capacitor 13 is 30 pF. This results, in general, in a delay time of about 100 microseconds, in accordance with the relationship $$t \geq c \cdot \Delta u / a \cdot i$$

wherein
t = delay-time
c = capacity value
$\Delta u$ = input voltage range of the discriminator (17)
a = multiplying factor of the current mirror circuit (36, 39)
i = current of the charge current source (35).

Figure 3:
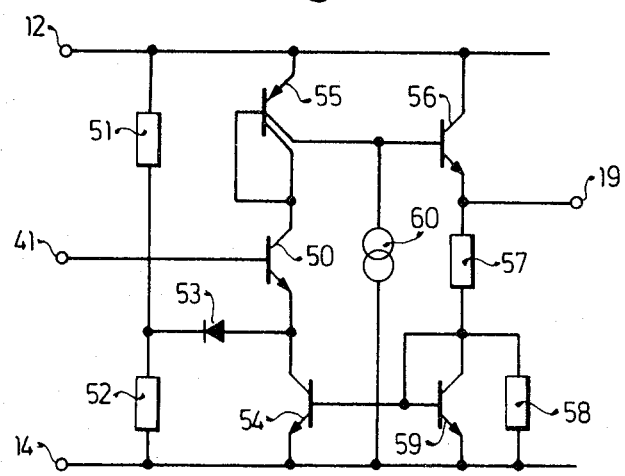
FIG. 3 is a fragmentary circuit diagram of a discriminator using a flip-flop circuit.

FIG. 3: The circuit of FIG. 3 illustrates a circuit for the discriminator 17 and bistable FF 18. A voltage divider formed of resistors 51, 52 is connected between terminals 12, 14. The emitter of transistor 50 is connected over diode 53 to the tap point of the voltage divider 51, 52 and through the emitter-collector path of transistor 54 to chassis or reference bus 14. Pnp dual collector transistor 55 is connected, similar to transistor 36, 39, between the collector of transistor 50 and terminal 12. Together with transistor 50 it forms a current mirror circuit. The second collector of transistor 55 is connected to the base of an npn transistor 56, the collector of which is connected to bus 12 and the emitter to terminal 19. Terminal 19 (FIG. 1) is connected to the reference bus 14 over a voltage divider formed of resistors 57, 58. The tap point of the voltage divider 57, 58 is connected over the collector-emitter path of an npn transistor to reference bus 14. The base of transistor 56 is connected to the collector thereof, and further to the base of transistor 54, forming therewith a circuit similar to transistors 42, 43 (FIG. 2). A current source 60 is connected between the base of transistor 56, the second collector of transistor 55, and chassis or reference bus 14.

Operation, FIG. 3: Let it be assumed that the base of transistor 50 has a voltage applied thereto which is within the operating window or non-response range or dead zone of the window threshold stage 17. Consequently, the current loop formed by the circuit of transistors 50, 55, 56, and resistor 57 and the consequent current mirror element 54, 59 is free of current or blocked. As the voltage on capacitor 13 rises, an upper threshold voltage of the discriminator will be reached when the threshold voltage determined by the voltage division ratio of the voltage divider 51, 52 and the threshold voltages of the transistor 51 and 53 are reached. From that point on, current will flow through the transistor 50, 55 and diode 53 and resistor 52 to reference bus 14. Consequently, current will flow in the second collector of transistor 55 and as a result current will then flow through transistor 56 which, as is apparent, is connected in emitter-follower circuit relationship. When a predetermined current value is reached, the voltage at the tap of voltage divider 57, 58 will reach a value which will cause the transistor 59 to be conductive. Transistor 59 is, actually, connected in form of a diode. Due to the current mirror arrangement 54–59, transistor 54 will now become conductive and will bypass the emitter current of transistor 50 to reference bus 14. The current will then jump to the value determined by the resistance value of resistor 57.

The base current of transistor 50 may drop; yet, within the dead-zone range, sufficient current will be maintained for control of the transistor 50 entirely independently of the voltage on voltage divider 51, 52. Since the base of transistor 50 is placed between the two collectors of transistors 55, 54, its voltage, which is identical to the voltage of capacitor 13, can be moved up or down without change of the already very small base current in the dead zone or window range of the window threshold stage 17. If, however, the base emitter voltage of the transistor 50 drops below the minimum operating voltage of transistor 15, transistor 50 will block. The lower threshold level of the discriminator 17 is then reached and the entire current loop is free from current. This change-over is rapid, pulse-type, and abrupt. The current source 60 is provided to drain off remaining current from the base of the transistor 56 in order to improve the switching speed and provide for reliable switching of the circuit. Current source or, rather, drain circuit 60 is not strictly necessary if rapidity of operation is not of substantial importance.

Figure 4:
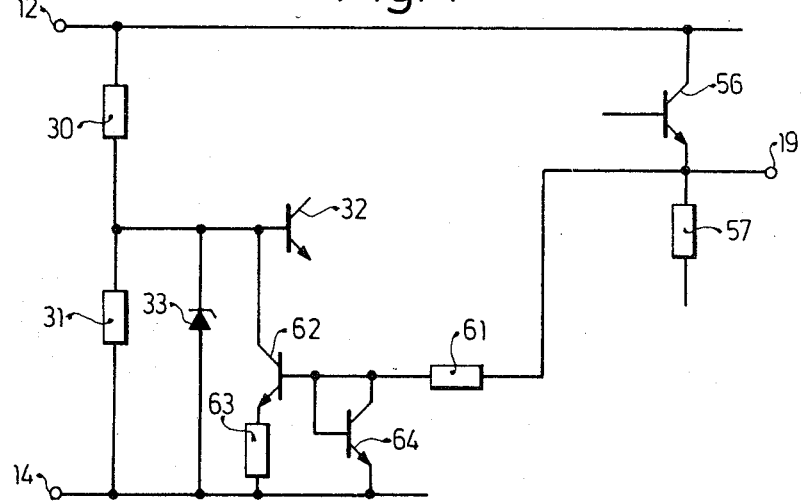
FIG. 4 is a fragmentary circuit, for combination with a circuit of FIGS. 2 and 3 to obtain hysteresis in the high-low discrimination by the discriminator of FIG. 3 by feedback.

FIG. 4: The circuit is an example to apply disturbance values to the input of the difference amplifier 10. The input to the difference amplifier is briefly illustrated as in FIG. 2, including the circuit components 30, 31, 32, 33. The elements 56, 57 correspond to the equally denoted elements of FIG. 3 and show a portion of the bistable circuit, and its output, respectively. The output terminal 19 is connected over a feedback resistor 61 with the base of an npn transistor 62, the collector of which is connected to the base of transistor 32. The emitter of transistor 62 is connected through resistor 63 to reference bus 14. The base of transistor 62 is further connected both to the collector and base of an npn transistor 64, the emitter of which is connected to the reference bus 14.

Operation, circuit of FIG. 4: The disturbance or additional control circuit provided by FIG. 4 can be used to result in negative or positive hysteresis, based on whether the feedback is negative feedback or positive feedback. FIG. 4 illustrates a negative feedback circuit. If the voltage at terminal 19 suddenly rises—see FIG. 3 and operation of that circuit—the current mirror arrangement 62, 64 becomes conductive, and the base voltage of transistor 32 drops. Consequently, the voltage across the capacitor 13 drops more rapidly. This increases the frequency of operation of the system. Any possible instabilities thus can be compensated by proper arrangement of the feedback. For example, the frequency can be dropped by positive feedback. Negative hysteresis would not be practicable with the previously discussed prior art circuit since this would result in transition from an ON-OFF control arrangement to a continuous or analog control, which substantially degrades the static response of the control loop. The simple arrangement to increase the operating frequency of the present circuit is a specific advantage thereof.

The feedback circuit, whether it be negative or positive feedback, can be differently arranged. For example, it can be connected to the other input terminal of the difference amplifier, that is, for example to terminal 11, which is, the base of transistor 38, rather than to the base of transistor 32. Such feedback, properly phased, can be additional to, or alternative to the feedback circuit shown in FIG. 4. Various other circuits may be used for those illustrated in FIGS. 2 and 3, and different types of difference amplifiers, integrators, discriminators, and bistable circuits can be used rather than those disclosed in detail in FIGS. 2, 3 and 4 for the difference amplifier 10, integrators 13, 15, 16, discriminators 17, and circuit 18. The charge and discharge circuits 16, 15 can be interchanged with due regard to phase relationships in the entire control loop and consideration of proper phasing of field current supply to the dynamo electric generator.

The integrator 21 can be any well known integrating circuit. Rather than using an integrator, other circuits can be used to prevent voltage collapse due to the presence of the bypass diode 24, and the charge carriers stored therein. In order to inhibit interruption of the base current of the output transistor 22 (FIG. 1) in spite of voltage collapse, it is possible to use a driver and preamplifier arrangement which, by suitable dimensioning of coupling resistors, prevents the effect of charge carriers stored in the diode 24 and possible voltage collapse effects on the transistor 22. Additional circuit components formed only of resistors and semiconductor elements can readily be integrated with the entire circuit, so that one of the advantages of the arrangement—possibility of complete integration—is retained.

Various other changes and modifications may be made within the scope of the inventive concept.

We claim:
1. Voltage regulator, particularly for automotive use, for a dynamo electric generator (A) adapted for operation under variable speed conditions and for connection to a field winding (23) of the generator (A) and control of the energization thereof, comprising
   means (C,12) connected to the generator (A) and furnishing an instantaneous voltage signal representative of the output voltage of the generator:
   a reference source (R,40) providing a reference voltage;
   a differential amplifier (10) having the instantaneous voltage signal and the reference voltage connected thereto;
   a capacitor (13);
   means (16, 35) supplying a charge current to the capacitor;
   means (15) draining discharge current from the capacitor;

said capacitor charge current supply means (16, 35) and discharge current drain means (15) being connected to and controlled by said difference amplifier (10) in accordance with the relative values of said instantaneous voltage signal and said reference voltage;

a high-and-low discriminator (17) connected to and controlled by the voltage across said capacitor;

and means (19, 20, 21, 22) controlling current flow to the field (23) of the dynamo electric generator under control of the output of the discriminator with respect to the relationship of the voltage across the capacitor to threshold levels of the discriminator by controlling the flow of current, or interruption of current, in accordance with the respective voltage levels across the capacitor and the high-and-low response levels of the discriminator, said capacitor (13) thereby simultaneously filtering or smoothing the control operation of the regulator while establishing the voltage levels controlling change-over of response of the discriminator.

2. Regulator according to claim 1, wherein the difference amplifier (10) is a symmetrical d-c voltage amplifier having two inputs and two outputs, one input each being connected to the reference voltage and to the instantaneous voltage signal representative of the output of the dynamo electric generator;

the difference amplifier having two symmetrical amplifying branches, each including two transistors (32, 36; 38, 39) connected in a current-mirror circuit;

the currents through respective transistors of the two amplifier branches controlling the charge current supply means (16) and discharge drain means (15) of the capacitor, respectively.

3. Regulator according to claim 2, wherein one of the transistors of each of the branches is a dual-collector transistor;

one of the dual collectors of each transistor in each branch being connected to control, respectively, the capacitor charge current supply means and the discharge current drain means, the dual collectors functioning as current dividers for the respective transistors.

4. Regulator according to claim 2, wherein the current supply means (16) comprises a collector of one of said transistors of one of said branches, whereby the charge current charging the capacitor (13) is directly applied as collector current from said one transistor;

and further including a current mirror circuit including at least a further transistor (42, 43), the further transistor being controlled by the collector current of a transistor in the other of said branches, said further transistor forming the discharge current drain means;

and wherein the collector-emitter path of the further transistor (42) is connected between the capacitor (13) and a reference bus (14).

5. Regulator according to claim 1, wherein the capacitor charge and discharge means include transistors and the capacitor (13) is connected as a Miller integrator.

6. Regulator according to claim 1, wherein the high-low discriminator (17) is a threshold discriminator having a higher upper threshold response level and a lower bottom response level;

and a bistable circuit (18) connected to and controlled by said discriminator (17) and changing state when either the lower, or the upper threshold level is passed.

7. Regulator according to claim 6, wherein the discriminator (17) comprises an input transistor (50);

a voltage divider (51, 52) having its voltage division tap point connected to the input transistor (51, 52);

and wherein the lower threshold level is determined, essentially, by the inherent voltage drop of the base-emitter diode junction of the input transistor, and the upper threshold level by the voltage at the tap point of the voltage divider and semiconductor junctions (base-emitter 50; 53) connected between the tap point of the voltage divider and the control input terminal to the input transistor (base-transistor 50) of the discriminator (17).

8. Regulator according to claim 7, further comprising an additional transistor (55) connected to the input transistor (50) in a current mirror circuit;

said additional transistor being connected to control the bistable stage (18) in dependence on at least a portion of the collector current flowing through the further transistor as a function of conductivity of the input transistor (50).

9. Regulator according to claim 7, wherein the bistable stage (18) includes a voltage divider (57, 58), an emitter-follower connected transistor connected to the discriminator input transistor (50) having a tap point;

a diode junction (59, base-emitter) connecting the tap point connected across a branch of the voltage divider;

and connection means connection the semiconductor elements (56, 57, 54, 50, 55) of the discriminator-bistable stage combination in a closed loop.

10. Regulator according to claim 9, wherein the diode junction (59) comprises a transistor in diode circuit;

a connected transistor (54) connected to the diode-connected transistor (59) and connected in form of a current mirror, the collector-emitter path of the connected transistor (54) forming a connection between the collector-emitter path of the input transistor (50) of the discriminator (17) to chassis or reference potential.

11. Regulator according to claim 9, further including a current drain circuit (60) connecting the emitter-follower transistor (56) to chassis or reference potential and forming a switching current drain connection.

12. Regulator according to claim 1, wherein the capacitor (13) introduces a delay time resulting in hysteresis;

further including a feedback circuit connected to at least one of the inputs of the difference amplifier (10) from the output thereof to apply a feedback current therethrough to control the hysteresis of the regulator.

13. Regulator according to claim 12, wherein the feedback connection is connected to the discriminator (17) and applies feedback current derived from the output of the discriminator (17) to the difference amplifier.

14. Regulator according to claim 13, wherein the discriminator (17) includes a bistable stage (18) switching over, or changing state in dependence on the relationship of the input signal to the discriminator, and hence the signal across the capacitor (13) with respect to the reference (R);

and wherein the feedback current is derived from the output of said bistable stage (18).

15. Regulator according to claim 12, wherein the feedback circuit is connected to the means (19–22) controlling current flow, or interruption of current flow to the field of the dynamo electric generator to apply a feedback signal to the difference amplifier.

16. Regulator according to claim 1, wherein the connecting means controlling current flow to the field of the dynamo electric generator include an integrator (21) and a semiconductor switch (22) controlled by the integrator.

17. Regulator according to claim 1 wherein the capacity value of said capacitor (13) is approximately in the order of about 30 pF.

18. Regulator according to claim 2 wherein the capacity value of said capacitor (13) is approximately in the order of about 30 pF.

19. Regulator according to claim 2 wherein the capacity value of said capacitor (13) is selected to provide a delay time in the order of about 100 microseconds, and has a capacity value determined by the relationship:

$$t \geq c \cdot \Delta u / a \cdot i$$

wherein
 t = delay-time
 c = capacity value
 $\Delta u$ = input voltage range of the discriminator (17)
 a = mulitplying factor of the current mirror circuit (36, 39)
 i = current of the charge current source (35).

20. Regulator according to claim 1 including a semiconductor current mirror amplification circuit forming part of said capacitor charge current supply means (16, 35) and discharge current drain means (15), respectively; and
 wherein the capacity value of said capacitor (13) is selected to provide a delay time in the order of about 100 microseconds, and has a capacity value determined by the relationship:

$$t \geq c \cdot \Delta u / a \cdot i$$

wherein
 t = delay-time
 c = capacity value
 $\Delta u$ = input voltage range of the discriminator (17)
 a = multiplying factor of the current mirror circuit (36, 39)
 i = current of the charge current source (35).

* * * * *